Nov. 11, 1958 — E. WILDHABER — 2,859,666
SIMULTANEOUSLY CUTTING HELICOIDAL SURFACES ON FACE TOOTHED MEMBERS
Filed April 19, 1954 — 3 Sheets-Sheet 1

INVENTOR.
ERNEST WILDHABER
BY Richard W. Treverton
ATTORNEY

Nov. 11, 1958

E. WILDHABER 2,859,666

SIMULTANEOUSLY CUTTING HELICOIDAL
SURFACES ON FACE TOOTHED MEMBERS

Filed April 19, 1954

*INVENTOR.*
ERNEST WILDHABER
BY Richard W. Treverton

ATTORNEY

Nov. 11, 1958 E. WILDHABER 2,859,666
SIMULTANEOUSLY CUTTING HELICOIDAL
SURFACES ON FACE TOOTHED MEMBERS
Filed April 19, 1954 3 Sheets-Sheet 3

*INVENTOR.*
ERNEST WILDHABER
BY
*Richard W. Treverton*
ATTORNEY

United States Patent Office 2,859,666
Patented Nov. 11, 1958

2,859,666

SIMULTANEOUSLY CUTTING HELICOIDAL SURFACES ON FACE TOOTHED MEMBERS

Ernest Wildhaber, Brighton, N. Y., assignor to The Gleason Works, Rochester, N. Y., a corporation of New York Application April 19, 1954, Serial No. 424,197

11 Claims. (Cl. 90—9.4)

The present invention relates to an improved method of cutting helicoidal surfaces on face toothed members, such as face couplings and clutches. These surfaces may take the form of double chamfers along the tops of the teeth to facilitate bringing the teeth of mating members into engagement.

In order to provide durability and high load carrying capacity, especially in face toothed clutches and couplings which are to be engaged and disengaged while under load, it is necessary that mating chamfers have a relatively large contact in all positions of engagement, and that such contact be at the centers rather than at the ends of the teeth. These requirements are met when the chamfers of both members are helicoidal surfaces which are tangent, at or near the centers of the teeth, to true helical surfaces whose helix axes coincide with the common axis of the members.

According to the present invention opposite helicoidal surfaces of this kind are produced simultaneously on opposite sides of spaced teeth of the coupling member, or workpiece, by a rotating cutter, in the form of either a bladed cutter or a grinding wheel, which presents a cutting circle to the helicoidal surfaces, by feeding the cutter relative to the workpiece in a plane common to the cutter axis and the axis of the workpiece. The feed motion combines translatory and angular motions of the cutting circle, relative to the workpiece, such that the circle remains substantially tangent, at the centers or mid-sections of the teeth to the true helical surfaces referred to above. The cutting of the helicoidal surfaces is preferably done with a radiused or rounded tip portion of the cutter which describes a toroidal cutting surface as the cutter rotates. As such a cutting surface is moved angularly relative to the work during the course of the feed motion it presents to the work a cutting circle of slightly varying diameter.

In a case where the helicoidal surfaces are in the form of chamfers at the tops of teeth, the adjacent tooth sides preferably are cut in the same operation with the chamfering, by portions of the cutter which describe a surface of revolution, usually conical in shape, adjoining the aforementioned toroidal cutting surface.

The feed motion may be effected in various ways, but it is preferably accomplished by combining an angular motion of the rotating cutter, about a pivot axis which intersects and is perpendicular to the cutter axis and to the aforementioned common axial plane, with a rectilinear motion of said pivot axis.

The method results in a substantial saving of time over prior known methods where the workpiece is rotated during the chamfering operation, and where helicoidal chamfers of opposite hand therefore are necessarily cut at different times in the cutting cycle.

The foregoing and other objects and advantages of the invention will appear from the following description made with reference to the accompanying drawings, wherein.

Figure 8:
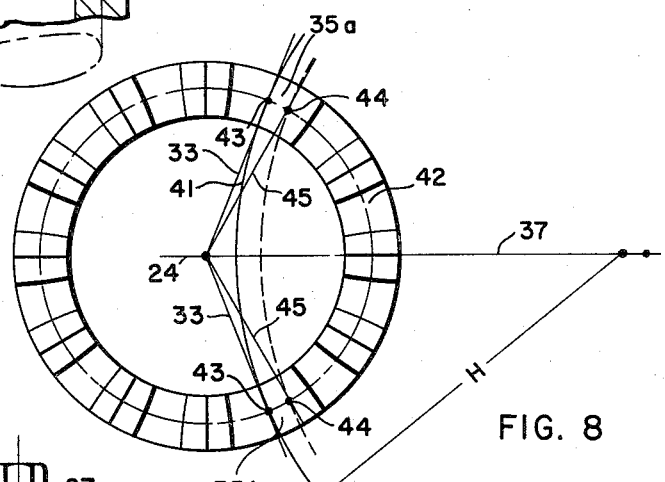
Figure 10:
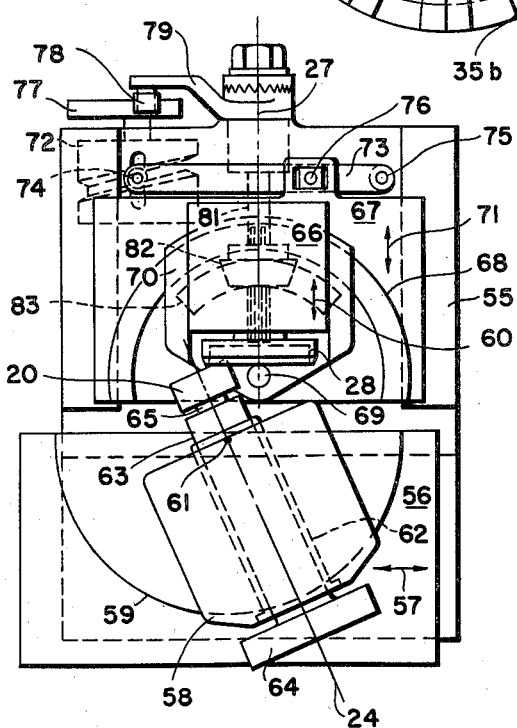
Figure 3:
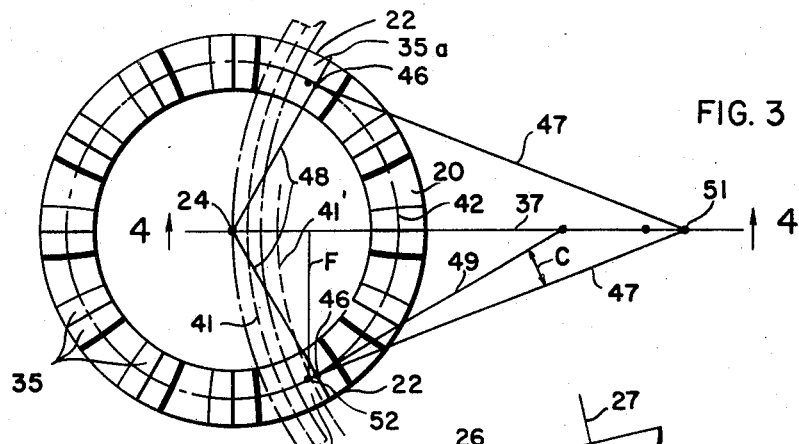
Fig. 3 is a plan view of a face toothed coupling member whose teeth have convex sides, showing in dash-dot lines the relative position of the cutter in its full depth position.
Figure 4:
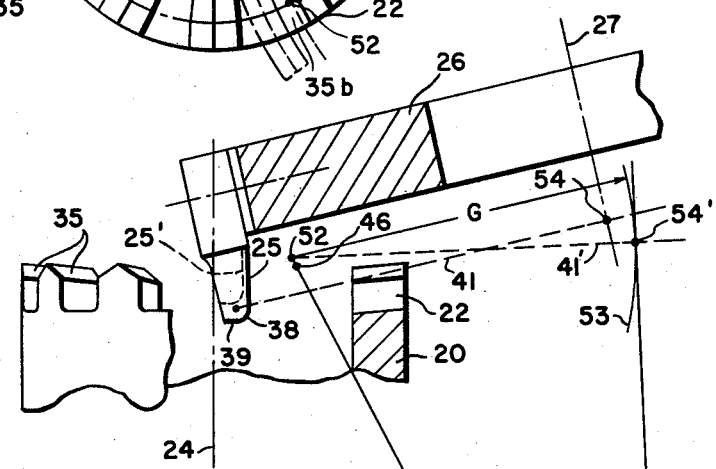
Fig. 4 is a fragmentary view of the coupling member and the cutter in the plane designated 4—4 in Fig. 3.
Figure 6:
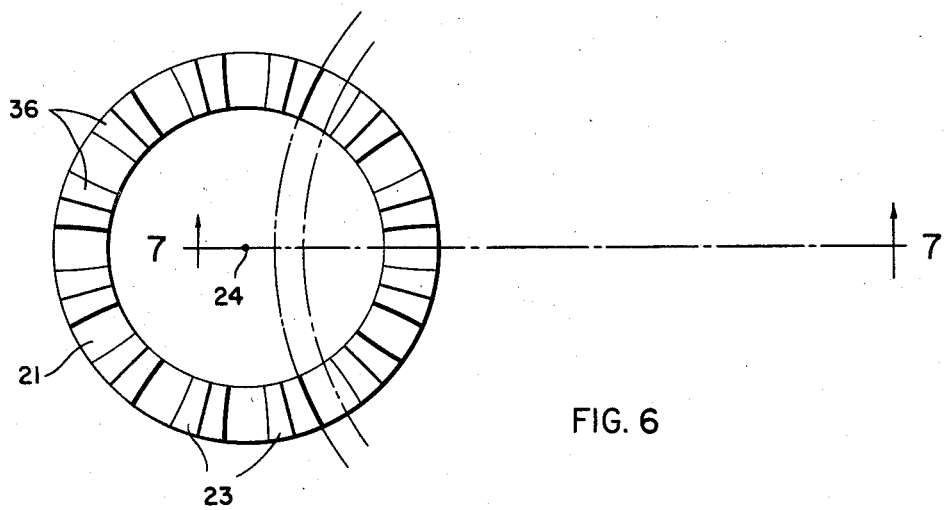
Figure 7:
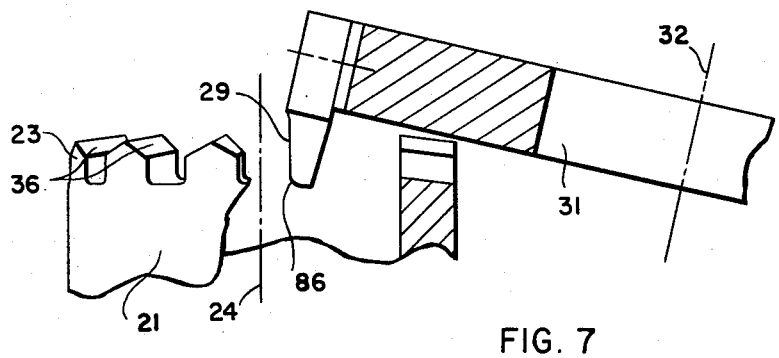
Figure 9:
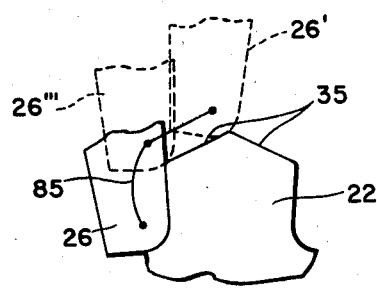

Figs. 6 and 7 are views respectively like Figs. 3 and 4, but showing the mating coupling member and its cutter, Fig. 7 being a section taken along line 7—7 of Fig. 6;

Fig. 8 is a schematic view similar to Fig. 3;

Fig. 9 is a diagrammatic view showing the feed path of the cutter relative to the work; and Fig. 10 is a plan view which illustrates diagrammatically the structure of one kind of machine on which the present invention may be practiced.

Figure 1:
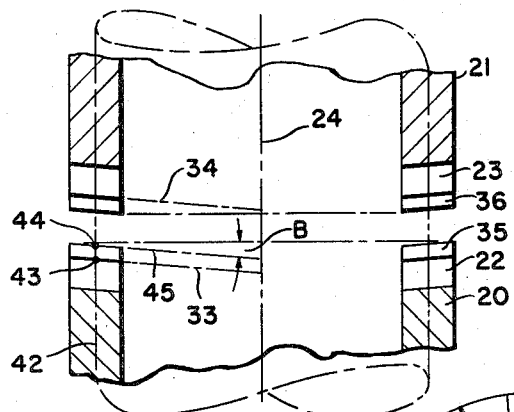
Fig. 1 is an axial sectional view through a face toothed coupling with the two members thereof disengaged.
Figure 2:
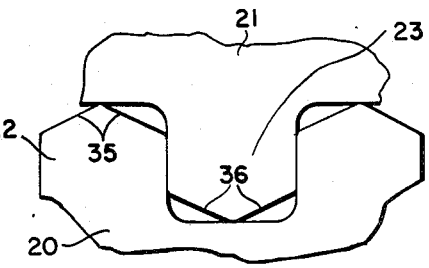
Fig. 2 is a fragmentary elevation, on a larger scale, showing the members fully engaged.

The coupling shown in Fig. 1 comprises face toothed members 20 and 21 having mating teeth 22 and 23, respectively. The teeth of both members may be generally the same as viewed at their ends, as in Fig. 2. The side faces of the teeth may extend at any desired angle, known as the pressure angle, to the axis 24, but in the coupling illustrated this angle is substantially zero. As shown in Fig. 3 the sides of teeth 22 are longitudinally convex, being produced by the inside conical surface of revolution described by inside cutting edges 25, Fig. 4, of a bladed face-mill cutter 26 rotating about axis 27, or by the corresponding inside surface of revolution of an annular grinding wheel such as is shown at 28 in Fig. 10. As will appear from Fig. 3 the opposite sides of spaced teeth 22 are cut simultaneously by the cutter, and hence these sides are parts of a common conical surface. After these two surfaces are cut, the cutter is withdrawn clear of the workpiece and the latter is indexed about axis 24 to bring the next two teeth into cutting position. The steps of cutting and indexing are repeated until both sides of every tooth have been cut. The mating clutch member 21 is cut by substantially the same method, except that as shown in Figs. 6 and 7 the sides of teeth 23 are produced by the outside conical surface of revolution described by outside cutting edges 29 of bladed cutter 31 rotating about axis 32, or by the corresponding outside surface of revolution of an annular grinding wheel.

The side cutting edges 25 and 29 are preferably inclined to the respective cutter axes 27 and 32 so that the blades may be relieved in an axial direction. With such relief, when the blades are sharpened back the cutting edges recede axially. For example edges 25 recede to the position indicated by dotted line 25′, Fig. 4, so that only an axial adjustment is required to restore the cutter to its original relation to the work. The effective cutter diameter is not affected by sharpening. However when cutting clutch teeth of low or zero pressure angle the cutter axis must be inclined to the work axis 24 which causes the teeth to be inclined to the face plane of the coupling in the direction of lines 33 and 34 in Fig. 1. The bottoms and tops of the teeth thus lie on conical instead of plane surfaces.

The helicoidal surfaces with which the present invention is primarily concerned are the chamfers 35 at the tops of teeth 22, and the corresponding chamfers 36 at the tops of teeth 23. In carrying out the invention in the production of teeth 22 the rotating cutter 26 is fed in the common plane 37 of axes 24 and 27 to simultaneously traverse the two opposite chamfers designated 35a and 35b in Fig. 3. The cutting of these chamfers is accomplished by rounds 38 on the cutter blades which adjoin side cutting edges 25 and the tip cutting edges 39. As the cutter rotates about axis 27, rounds 38 describe a toroidal cutting surface whose center circle is designated 41.

To facilitate an understanding of the feed motion, reference is first made to Fig. 8 where the radius of the round 38 is zero, so that the circle 41 becomes the intersection of the two surfaces of revolution described by edges 25 and 39 of the cutter blades and is the cutting circle which generates simultaneously the surfaces 35a and 35b. At mid-points along their lengths the clutch teeth are intersected by an imaginary mid-section cylinder 42, Figs. 1 and 8. The end points of the lines of intersection of surfaces 35a and 35b with this cylinder are designated 43 and 44. In its full line position in Fig. 8, circle 41 passes through the two points 43 and is so inclined to the plane of the view that it is tangent at these points 43 to true helical surfaces whose axes are coincident with the clutch axis 24 and which are made up of an infinite number of straight line elements all intersecting the axis 24 at the same angle. Lines 33 and 45 are the straight line elements of this kind which pass through points 43 and 44 respectively. In other words the circle 41 is tangent at points 43 with the tangent planes of the helicoidal surfaces 35a and 35b, these tangent planes being the planes which contain lines 33 and are tangent to the middle sections of the helicoidal surfaces at points 43.

The circle 41 is moved, keeping its center in the plane of symmetry 37, in such manner that it follows along the desired section of the chamfers in cylinder 42. As the circle moves it is tilted to the plane of Fig. 8 by whatever amount is necessary to keep it tangent at the cylinder 42 with the tangent planes of the helicoidal surfaces. Thus when it reaches the dotted line position in Fig. 8, wherein it passes through end points 44, it is tangent at these points with the tangent planes of the helicoidal surfaces which contain the straight line elements 45. The circle will not ordinarily (except in possibly one position) be tangent to these straight line elements themselves, but will intersect them at mid-section 42.

It will now be apparent that for a given shape of chamfer at mid-points along the length of the teeth, the position of the circle 41 and its inclination are fully determined through this requirement of tangency. Thus the two chamfers generated simultaneously by circle 41 are helicoidal surfaces which are tangent to, and whose midsections are coincident with the mid-sections of, true helical surfaces of opposite hand whose straight line elements include lines 33 and 45. Since the circle represents an inside cutting edge the helicoidal surfaces 35 will of course have convex curvature in any of various axial and cross sections through the member 20.

The chamfers 36 of the mating member 21, if generated with a circle of the same diameter as circle 41 but constituting an outside cutting edge, and moved and tilted in exactly the same way as circle 41, will be of complementary concave curvature to convex chamfers 35. They will have exactly the correct direction at mid-section 42 for contact there with chamfers 35, and, at least in the case where the mating helicoids are of constant lead from end to end, i. e. between terminal points 43 and 44, they will have nearly full contact over their entire overlapping areas in any position of engagement. In practice there will be a desirable amount of ease-off at the outer and inner ends of the teeth. It will be understood that the mid-section cylinder 42 selected as the locus of tangency need not be exactly halfway between the inner and outer ends of the teeth. If the center of the area of contact is wanted nearer the outer end or the inner end of the teeth, the diameter of cylinder 42 is simply made larger or smaller, respectively. Also the method is not confined to helicoids of constant lead. If desired they may be of varying lead between their terminal points 43 and 44, so that they will have convex profiles instead of the straight profiles shown in Fig. 2. It will be apparent that in producing the helicoids the relative feed of the cutter in plane 37 may be in either direction, i. e. either from point 43 to point 44, or vice versa.

When employing cutters with finite edge radii, as at 38 in Fig. 4, the principles remain essentially the same as described for zero edge radius. To determine the relative feed path of the cutter the procedure now to be explained may be followed.

A series of points along the mean helix, i. e. along the profile of the chamfers at the selected cylinder 42, are first determined. Point 46, Figs. 3 and 4 is one such point. The surface normal 47 at this point is then determined, this normal being perpendicular to the tangent plane of the helicoidal surface at point 46. In other words this surface normal is a line perpendicular to the plane containing the tangent of the mean helix at point 46 and also containing the line 48, which bears the same relation to point 46 that line 45 bears to point 44, Fig. 8. The inclination A (not shown) of the tangent of this mean helix (at any point therealong) to the plane of rotation of member 20 is determined from the equation:

$$\operatorname{Tan} A = \frac{L}{2\pi R}$$

where L is the lead of the mean helix along axis 24 at the point considered (such as 46), and R is the radial distance of the point from axis 24.

If line 48 were at right angles to the axis 24, the surface normal 47 would project into the peripheral tangent 49 in Fig. 3 (i. e. the tangent to cylinder 42 at point 46), but because it is inclined to the face plane of member 20 at dedendum angle B, Fig. 1, it projects into the plane of Fig. 3 at angle C to peripheral tangent 49, and is inclined at an angle D (not shown) to the direction of the axis 24. The angles C and D can be determined from the following equations:

$$\operatorname{Tan} C = \frac{\tan B}{\tan A}$$

$$\operatorname{Tan} D = \frac{\tan A}{\cos C}$$

The surface normal 47 intersects plane 37 at point 51. The cutter axis must pass through this point when point 46 is being cut because 47 is then also a normal to the surface of revolution described by cutting edge round 38. All normals to any surface of revolution must intersect the axis of revolution.

The point 52 on surface normal 47 is now considered. This point is spaced from point 46 by a distance equal to the radius of cutter edge round 38. Circle 41' (representing the position of circle 41 when point 46 is being cut by round 38) necessarily passes through point 52, and the latter is offset distance F, Fig. 3, from the plane of symmetry 37, so that in the projection into this plane (Fig. 4) the distance G between point 52 and the center of circle 41' is smaller than the actual radius H of the circle 41.

$$G = \sqrt{H^2 - F^2}$$

An arc 53 with radius G is swung about point 52 (in Fig. 4 or plane 37). The tangent 27' to this arc which passes through point 51 is thus determined to be the position of cutter axis 27 when point 46 is being cut. The center of circle 41' is designated 54'. The inclination of axis 27' to the work axis 24 is angle J'.

Figure 5:
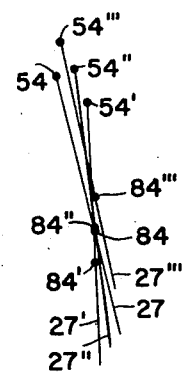
Fig. 5 is a diagrammatic view illustrating the relative feed motion between the cutter and the coupling member of Figs. 3 and 4.

To determine the path through which the cutter must move in plane 37 to produce the desired helicoidal surfaces 35a and 35b a whole series of circle center points and cutter inclinations, corresponding to 54' and J', may be determined. As shown in Fig. 5, these may include such circle center points as 54', 54'', 54''' and 54, and cutter axis positions as 27', 27'', 27''' and 27, corresponding to the respective positions of the cutter when cutting (1) the outermost mid-points of the chamfers such as 46 in Figs. 3 and 4 or 44 in Fig. 8, (2) intermediate mid-points, (3) the innermost mid-points such as 43 in Fig. 8, and (4) the side surfaces of the teeth, this being the full depth position of the cutter shown in Fig. 4. Such a series of determinations can of course be made with much greater accuracy by computation than by geometrical construction.

For practicing the method of the present invention a machine of the general kind disclosed in my Patent No. 2,464,913, granted March 22, 1949, may be employed. As shown in Fig. 10, this machine includes a base 55 on which a work slide 56 is adjustable in the direction of arrow 57. A column 58 is adjustable angularly on the slide on arcuate way 59 about vertical axis 61. Vertically adjustable in the column is a slide 62 carrying a housing 63 and index mechanism 64 for a work spindle 65 on which is mounted the coupling member 20 that is being cut. Preferably the housing 63 is adjustable in slide 62 in the direction of the work axis 24.

The cutter, in this case abrasive wheel 28, is rotated about its axis 27 by a motor or other suitable drive within or extending through a cutter spindle housing 66 which is adjustable rectilinearly, in the direction of arrow 60 on a swinging base 70, the latter being angularly movable on a cutter slide 67. This angular movement is on arcuate way 68 on slide 67 about vertical axis 69. Slide 67 is reciprocated on the base 55, in the direction of arrow 71, by a cam 72 acting through a lever 73, the latter carrying a cam follower roller 74 and being fulcrumed upon the base and pivoted to slide 67 respectively at 75 and 76. The cam 72 is rotatable in the base on the same shaft with a cam 77 which acts to swing the rotating cutter 28 about vertical axis 69 in timed relation with its rectilinear motion in direction 71. The cam 77 acts through a cam follower roller 78 on an arm 79 secured to a shaft 81 journaled in the base. Angular motion of this shaft is effective, through a bevel pinion 82 that is splined to the shaft and that moves axially as a unit with slide 67, and through a bevel gear segment 83 that mates with pinion 82 and is secured to the swinging base 70, to turn the latter about axis 69. The machine preferably includes a means, not shown, which operably connects the cams 72 and 77 with the index mechanism 64 so that once during each rotation of the cams, at a time when cam 74 has withdrawn the cutter from the work, the work will be advanced by one tooth.

The cams are made to the shape necessary to effect the infeed of the cutter in the direction of arrow 71 and the turning of the cutter about axis 69 at predetermined relative rates. How these rates may be determined will now be explained with further reference to Fig. 5.

As there shown, the successive points 54', 54'', 54''' and 54 do not lie along a single straight line of feed such as that indicated by arrow 71 of Fig. 10. However by trial or calculation a series of points which do lie along or nearly along a straight line, such as 84', 84'', 84''' and 84, can be chosen, these last-named points being spaced at equal distances from the respective points 54', 54'', etc., along cutter axis representing lines 27', 27'', etc. A cutter feed along a line connecting these points 84', 84'', etc., coupled with an angular feed about such points will produce exactly the same motion as a feed along a path connecting points 54', 54'', etc. with a like angular feed. The machine is adjusted so that its rectilinear feed 71, Fig. 10, is at the angle which a straight line connecting two points, say points 84' and 84'' in Fig. 5, makes with work axis 24. The necessary angular feed about these points is effected by the pivoting about axis 69 of the machine.

By accurate computation of the points 84', 84'', etc., and of the inclinations of lines 27', 27'', etc., there is assurance that the mean surface normal (47, for example) is exactly right for a selected mean point 46 of the helicoid, that the desired helicoidal surface itself is closely approximated, and that the sides of the teeth, cut with the side edges 25, are also exactly right. The approximation can be further refined by admitting only such departures from the desired helicoid that will tend to produce a helicoid of slightly varying or differently varying lead.

Referring to Figs. 5 and 9, with the cutter adjacent the outside ends of the opposite chamfers, i. e. about the position designated 26' in Fig. 9, the cam 72 effects an outfeed of the cutter, to move the axis 69, Fig. 10, through successive positions 84', 84'' and 84''', Fig. 5, accompanied by a counterclockwise pivoting of the cutter effected by cam 77 such that the cutter follows path 85, Fig. 9. The chamfers are completed when the pivot is at point 84''' and the cutter is in position 26'''. Thereafter the feed by cam 72 continues in such manner (usually reversing to become an infeed) that the cutter moves depthwise into the tooth space, from dotted line position 26''' to full line position 26 in Fig. 9. The pivoting continues in the same direction for a short time to carry the cutter away from the surfaces to which the sides of the teeth are to be finish cut. At or about the time when the full depth position is reached the pivotal or angular feed by cam 77 reverses, bringing the cutter to its full line position, Fig. 9, after which the cutter is withdrawn in a path clear of the tooth sides (not shown). In this way the opposite helicoidal chamfers 35a and 35b and the tooth sides adjacent the chamfers are completed in a single operation.

The chamfers and tooth sides of mating clutch member 21 are produced in substantially the same manner as those of member 20, except that, as shown in Figs. 6 and 7, the cutter 31 has outside cutting edge rounds 86 adjoining its outside cutting edges 29 so that the chamfers 36 as well as the sides of teeth 23 are of concave shape. Exactly the same procedure described in connection with Figs. 3, 4 and 5 may be employed to determine the rectilinear and angular feed motions which must be imparted to the cutter 31 to produce the chamfers of the desired helicoidal shape.

Having now described the preferred manner of practicing my invention, what I claim is:

1. The method of simultaneously producing helicoidal surfaces of opposite hand on opposite sides of spaced teeth of a face toothed member, employing a rotating annular cutter which presents a tip edge cutting circle to the work, which method comprises maintaining the cutter axis and the work axis in a common plane and, while holding the work against rotation about its axis, effecting a relative feed in said plane, to cause the cutting circle to traverse both helicoidal surfaces simultaneously, the feed in said plane including a relative angular motion which maintains the cutting circle substantially tangent to the tangent planes of the helicoidal surfaces at midpoints along the length of the teeth.

2. The method of claim 1 in which the rotating cutter describes side and tip cutting surfaces of revolution joined by a toroidal surface of revolution which contains said tip edge cutting circle, the radius of said circle varying as the feed brings various points along the axial profile of the toroidal surface into contact with the helicoidal surfaces.

3. The method of simultaneously cutting the opposite sides of spaced teeth of a face toothed member and simultaneously cutting opposite helicoidal chamfers on the tops of said spaced teeth, employing a rotating annular cutter which presents a side cutting surface of revolution and a tip edge cutting circle to the work, which method comprises maintaining the cutter axis and the work axis in a common plane and, while holding the work against rotation about its axis, effecting a relative feed in said plane, to cause the side cutting surface of revolution to simultaneously produce the opposite sides of said spaced teeth and to cause the cutting circle to traverse the chamfers at the tops of said teeth, the feed in said plane during said traverse including a relative angular motion which maintains the cutting circle substantially tangent to the tangent plane of the helicoidal chamfers at mid-points along the length of the teeth.

4. The method of simultaneously producing opposite helicoidal surfaces on opposite sides of spaced teeth of a face toothed member, employing a rotating annular cutter which presents a tip edge cutting circle to the work, which method comprises maintaining the cutter axis and the work axis in a common plane and, while holding the work against rotation about its axis, effecting a relative feed in said plane, to cause the cutting circle to traverse both helicoidal surfaces simultaneously, said relative feed in said plane including a combined translatory motion and angular motion between the rotating cutter and the work.

5. The method of simultaneously cutting the opposite sides of spaced teeth of a face toothed member and simultaneously cutting opposite helicoidal chamfers on the tops of said spaced teeth, employing a rotating annular cutter which presents a side cutting surface of revolution and a tip edge cutting circle to the work, which method comprises maintaining the cutter axis and the work axis in a common plane and, while holding the work against rotation about its axis, effecting a relative feed in said plane, to cause the side cutting surface of revolution to simultaneously produce the opposite sides of said spaced teeth and to cause the cutting circle to traverse the chamfers at the tops of said teeth, the relative feed in said plane during said traverse including a combined translatory motion and angular motion of the rotating cutter relative to the work.

6. The method of simultaneously producing helicoidal surfaces of opposite hand on opposite sides of spaced teeth of a face toothed member, employing a rotating annular cutter which presents a tip edge cutting circle to the work, which method comprises maintaining the cutter axis and the work axis in a common plane and, while holding the work against rotation about its axis, effecting a relative feed in said plane, to cause the cutting circle to traverse both helicoidal surfaces simultaneously, the feed in said plane including a relative angular motion between the rotating cutter and the work about a pivot axis which intersects the cutter axis at right angles at a fixed distance from the face of the cutter and a concomitant relative rectilinear motion between said pivot axis and the work.

7. The method of simultaneously cutting the opposite sides of spaced teeth of a face toothed member and simultaneously cutting opposite helicoidal chamfers on the tops of said spaced teeth, employing a rotating annular cutter which presents a side cutting surface of revolution and a tip edge cutting circle to the work, which method comprises maintaining the cutter axis and the work axis in a common plane and, while holding the work against rotation about its axis, effecting a relative feed in said plane, to cause the side cutting surface of revolution to simultaneously produce the opposite sides of said spaced teeth and to cause the cutting circle to traverse the chamfers at the tops of said teeth, the feed in said plane during said traverse including a relative angular motion between the rotating cutter and work about a pivot axis which intersects the cutter axis at right angles at a fixed distance from the face of the cutter and a concomitant relative rectilinear motion between said pivot axis and the work.

8. The method of simultaneously producing opposite helicoidal surfaces on opposite sides of a face toothed workpiece, employing a rotating annular cutter that presents a toroidal cutting surface to the work, which method comprises feeding the rotating cutter relative to the work while holding the work stationary and maintaining the cutter axis and the work axis in a common plane, whereby a circle on the toroidal cutting surface may simultaneously contact both chamfers, the feed including an angular motion of the cutter about a pivot axis which intersects the cutter axis at a right angle at a fixed distance from the face of the cutter and a concomitant rectilinear motion of said pivot axis at a rate which maintains the circle of the toroidal cutting surface, which is in simultaneous contact with the helicoidal surfaces, tangent to the tangent plane of said helicoidal surfaces at mid-points along the length of the teeth.

9. The method of simultaneously cutting the opposite sides of spaced teeth of a face toothed workpiece and simultaneously cutting opposite helicoidal chamfers on the tops of said spaced teeth, employing an annular cutter having a side cutting conical surface and an adjoining toroidal edge surface, which method comprises maintaining the cutter axis and the work axis in a common plane and, while holding the work against rotation about its axis, effecting a relative feed in said plane, to cause the toroidal cutting surface to traverse the helicoidal chamfers at the tops of said teeth and subsequently to cause the conical cutting surface to produce simultaneously the opposite sides of said teeth, the feed during said traverse including an angular motion of the cutter about a pivot axis which intersects the cutter axis at a right angle at a fixed distance from the face of the cutter and a concomitant rectilinear motion of said pivot axis at a rate which maintains the circle of the toroidal cutting surface, which is in simultaneous contact with the helicoidal surfaces, tangent to the tangent plane of said helicoidal surfaces at mid-points along the length of the teeth.

10. The method of simultaneously producing helicoidal surfaces of opposite hand on opposite sides of spaced teeth of a face toothed member, employing a rotary tool which presents a cuting circle of revolution to the member, which comprises maintaining the cutter axis and the work axis in a common plane and, while holding the work against rotation about its axis, effecting a relative feed between the cutter and the work in said plane in a path such that the cutting circle simultaneously traverses both of said surfaces and while so doing remains substantially tangent, at mid-points along the length of the teeth, with true helical surfaces whose axes are coincident with the axis of the member.

11. The method of claim 10 in which the portion of the rotary tool which produces said helicoidal surfaces describes an external toroid which during the traverse of said surfaces presents to them a cutting circle of revolution of varying diameter.

References Cited in the file of this patent

UNITED STATES PATENTS

| | | |
|---|---|---|
| 2,438,329 | Wildhaber | Mar. 23, 1948 |
| 2,443,089 | Wildhaber | June 8, 1948 |
| 2,464,913 | Wildhaber | Mar. 22, 1949 |